United States Patent
Furusako et al.

(10) Patent No.: US 10,099,311 B2
(45) Date of Patent: Oct. 16, 2018

(54) SPOT WELDING METHOD

(71) Applicant: NIPPON STEEL & SUMITOMO METAL CORPORATION, Tokyo (JP)

(72) Inventors: Seiji Furusako, Tokyo (JP); Fuminori Watanabe, Tokyo (JP); Yasunobu Miyazaki, Tokyo (JP); Tohru Okada, Tokyo (JP); Tasuku Zeniya, Tokyo (JP); Koichi Sato, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 152 days.

(21) Appl. No.: 14/785,187

(22) PCT Filed: Apr. 16, 2014

(86) PCT No.: PCT/JP2014/060848
§ 371 (c)(1),
(2) Date: Oct. 16, 2015

(87) PCT Pub. No.: WO2014/171495
PCT Pub. Date: Oct. 23, 2014

(65) Prior Publication Data
US 2016/0067814 A1 Mar. 10, 2016

(30) Foreign Application Priority Data

Apr. 17, 2013 (JP) .................. 2013-086837

(51) Int. Cl.
*B23K 11/16* (2006.01)
*B23K 11/11* (2006.01)
*B23K 11/24* (2006.01)
*B23K 11/30* (2006.01)
*B23K 103/04* (2006.01)

(52) U.S. Cl.
CPC .............. *B23K 11/16* (2013.01); *B23K 11/11* (2013.01); *B23K 11/115* (2013.01); *B23K 11/24* (2013.01);
(Continued)

(58) Field of Classification Search
CPC ...... B23K 11/115; B23K 11/11; B23K 11/166; B23K 11/24; B23K 11/3054;
(Continued)

(56) References Cited

U.S. PATENT DOCUMENTS

2012/0141829 A1* 6/2012 Oikawa ................. B23K 11/115
428/683
2012/0225313 A1 9/2012 Vanimisetti et al.

FOREIGN PATENT DOCUMENTS

CN 102625740 A 8/2012
JP 2002-103048 4/2002
(Continued)

OTHER PUBLICATIONS

Machine Translation—JP 2010-0172946 performed Jul. 10, 2017.*
(Continued)

*Primary Examiner* — Brian Jennison
(74) *Attorney, Agent, or Firm* — Birch, Stewart, Kolasch & Birch, LLP

(57) ABSTRACT

A spot welding method is a method of performing spot welding to obtain a spot welded joint, the method including a spot welding with two-stage welding, setting a ratio ($I_2/I_1$) of a current $I_2$ of a second welding process to a current $I_1$ of a first welding process to from 0.5 to 0.8, setting a time tc of a cooling process within a range of from 0.8×tmin to 2.5×tmin wherein tmin is calculated using the equation ($0.2 \times H^2$) according to a sheet thickness H of the steel sheets, setting an welding time t2 of a second welding process within a range of from 0.7×tmin to 2.5×tmin, and setting a pressure from the cooling process onward to greater than a pressure until the first welding process.

5 Claims, 3 Drawing Sheets

(52) U.S. Cl.
CPC ........ *B23K 11/241* (2013.01); *B23K 11/3054* (2013.01); *B23K 2203/04* (2013.01)

(58) Field of Classification Search
CPC ............ B23K 2201/18; B23K 2201/34; B23K 2203/04; C22C 38/02; C22C 38/04; C22C 38/06; B32B 15/01; B32B 15/04
USPC ...................................................... 219/86.31
See application file for complete search history.

(56) References Cited

FOREIGN PATENT DOCUMENTS

| JP | 2007-268604 | 10/2007 |
|---|---|---|
| JP | 2008-229720 | 10/2008 |
| JP | 2009-001839 | 1/2009 |
| JP | 2010-115706 | 5/2010 |
| JP | 2010-172946 A | 8/2010 |
| JP | 2012-046816 | 3/2012 |
| JP | 2012-192455 | 10/2012 |

OTHER PUBLICATIONS

Office Action dated Jan. 22, 2016, issued in corresponding Taiwanese Application No. 103114032.
Extended European Search Report, dated Nov. 7, 2016, for European Application No. 14784656.2.
Shinozaki, M. et al., "Improvement in Fatigue Strength of Spot Welded High Strength Sheet Steel Joints", Tetsu-to-Hagane, 1982, No. 9 pp. 1444-1451, vol. 68, Japan.

* cited by examiner

SPOT WELDING METHOD

CROSS-REFERENCE TO RELATED APPLICATIONS

This application is a national stage application of International Application No. PCT/JP2014/060848, filed on Apr. 16, 2014, which is incorporated herein by reference in its entirety, and which claims priority to Japanese Patent Application No. 2013-086837, filed on Apr. 17, 2013.

TECHNICAL FIELD

The present invention relates to a spot welding method employing a high strength steel sheet having a tensile strength of 980 MPa or greater, used in automotive fields and the like.

BACKGROUND ART

Recently, in the automotive fields, there is demand for more lightweight vehicle bodies in order to achieve lower fuel consumption and a reduction in $CO_2$ emissions, and there is also demand for higher vehicle body rigidity in order to improve collision safety. In order to meet these demands, the need to employ high strength steel sheets in vehicle bodies, components, and the like is on the rise.

Processes in vehicle body assembly, component attachment, and the like predominantly employ spot welding. However, there have hitherto been issues regarding the tensile strength of joints, particularly when spot welding is used on high strength steel sheets having a high tensile strength.

There is a large amount of carbon etc. contained in the base material of a high strength steel sheet in order to attain its strength. Moreover, in spot welding, rapid cooling is performed immediately after heating the weld portion, such that the weld portion adopts a martensite structure, increasing the hardness of the weld portion and a heat affected zone, and reducing ductility.

In spot welding of high strength steel sheets, methods using a two-stage welding, in which a post heating welding is performed after a main welding, exist as methods to improve spot weld portion ductility and secure joint strength.

For example, in Japanese Patent Application Laid-Open (JP-A) No. 2002-103048, a tempering welding is performed once a fixed duration has elapsed after a spot welding has ended. The spot weld portion (a nugget portion and a heat affected zone) is annealed, reducing the hardness of the weld portion. JP-A No. 2010-115706 describes a method in which, after forming the nugget with a main welding, a post heating welding is performed with a current value of the main welding current value or greater.

SUMMARY OF INVENTION

Technical Problem

Recently, issues of delayed fracture (hydrogen embrittlement) are emerging as problems when a high strength steel sheet having a high tensile strength has been spot welded. A high strength steel sheet having a carbon content of 0.15% by mass or greater and a tensile strength of 980 Mpa or greater includes a large amount of quenching elements in addition to C, such as Si and Mn, such that quenching and hardening occur when the spot weld portions are heated and cooled during welding. Moreover, in a cooling process with thermal contraction, the weld portion is pulled from its periphery, such that there is a residual tensile stress distribution at room temperature.

Three major factors governing delayed fracture are the hardness of the steel sheet, residual stress, and the hydrogen content of the steel. Spot weld portions in the high strength steel sheet have high hardness and residual tensile stress distributions as described above, and are therefore locations vulnerable to delayed fracture should hydrogen penetration occur.

However, conventional two-stage welding methods do not give any consideration to improving the delayed fracture resistance characteristics of the weld portion.

Accordingly, an object of the present invention is a spot welding method for a high strength steel sheet having a carbon content of 0.15% by mass or greater and a tensile strength of 980 MPa or greater, in which stable high delayed fracture resistance characteristics are obtained while suppressing variation in hardness reduction by tempering.

Solution to Problem

In order to improve the delayed fracture resistance characteristics of spot welded joints, the inventors considered it very important to perform softening between a steel sheet press contact portion (also referred to as a corona bond), and an end portion of the nugget, where fractures develop and propagate. Due to this consideration, investigation was accordingly carried out into softening conditions from the steel sheet press contact portion to the nugget end portion, and into improving delayed fracture resistance characteristics by using a two-stage welding in which a post heating welding is performed after a main welding.

As a result, it was found that welded joints with improved delayed fracture resistance characteristics can be obtained by setting suitable conditions for the pressure up to a main welding, the pressure after the main welding, a cooling time, and a post heating welding.

The outline of the present invention arising from such investigation is as follows.

[1] A spot welding method in which high strength steel sheets each having a carbon content of 0.15% by mass or greater and a tensile strength of 980 MPa or greater are overlapped and spot welded to obtain a spot welded joint, the spot welding method including: a spot welding process that is split into three processes: comprising a first welding process that forms a nugget; a cooling process that follows the first welding process and during which a current of welding is zero; and a second welding process that follows the cooling process and in which the nugget is softened, and wherein during the spot welding, $I_2/I_1$ is set to from 0.5 to 0.8 wherein $I_1$ is a current in the first welding process and $I_2$ is a current in the second welding process, a time tc (sec) of the cooling process is set within a range of from 0.8×tmin to 2.5×tmin wherein tmin is calculated using Equation (1) below according to a sheet thickness H (mm) of the steel sheets, a welding time t2 (sec) of the second welding process is set within a range of from 0.7×tmin to 2.5×tmin, and pressure applied by electrodes from the cooling process onward is set to greater than a pressure applied by the electrodes until the first welding process $$tmin=0.2\times H^2. \tag{1}$$

[2] The spot welding method of [1], wherein the high strength steel sheets are plated steel sheets.

Advantageous Effects of Invention

The present invention is a spot welding method for a high strength steel sheet having a carbon content of 0.15% by mass or greater and a tensile strength of 980 MPa or greater, enabling variation to be suppressed in hardness reduction by tempering, and enabling stable high delayed fracture resistance characteristics to be obtained, while reducing welding time.

DESCRIPTION OF EMBODIMENTS

Explanation follows regarding an exemplary embodiment of the present invention, with reference to the attached drawings.

When performing spot welding on high strength steel sheets each having a carbon content of 0.15% or greater by mass and tensile strength of 980 MPa or above, a spot weld portion configured by a nugget and a heat affected zone is hardened by quenching in heating and cooling processes of welding. Moreover, in thermal contraction in the cooling process, the weld portion is pulled from its periphery, such that there is a residual tensile stress distribution at room temperature. For vehicle bodies, for example, hydrogen may penetrate the weld portions and cause delayed fracture (hydrogen embrittlement cracking) during vehicle body manufacture, or when running in corrosive environments.

Figure 3:
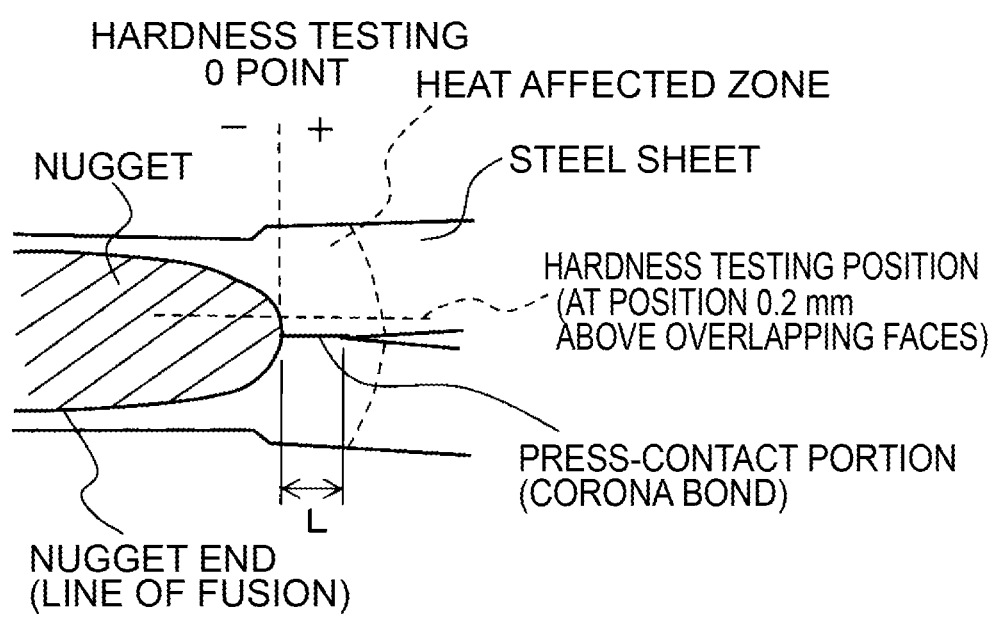
FIG. 3 is a diagram to explain a range for Vickers hardness testing at nugget end portions positioned at the front and rear of a line of fusion of a spot weld portion, and on a steel sheet press contact portion.

In spot welding with a two-stage welding, the inventors attempted to improve delayed fracture resistance characteristics by using post welding for tempering a martensite structure in the vicinity of a boundary (line of fusion) between a nugget formed by the main welding and a base material, to form tempered martensite. Specifically, the inventors produced numerous test samples by variously adjusting the ratio of the current amount of the post welding to the current amount of the main welding in the two-stage welding, adjusting the cooling time after welding, and adjusting the welding time of the post welding. As illustrated in FIG. 3, the inventors then tested the Vickers hardness along overlapping faces of the steel sheets, at nugget end portions positioned at the front and rear of the line of fusion and at a steel sheet press contact portion, and investigated the relationship between the welding conditions and the Vickers hardness. The inventors also investigated the relationship between the Vickers hardness and the delayed fracture resistance characteristics at the front and rear of the line of fusion.

As a result, it was found that achieving a tempered martensite structure in a range on either side of the front and rear of the line of fusion, and making the Vickers hardness 400 or lower, enables welded joints with excellent delayed fracture resistance characteristics to be achieved.

Figure 1:
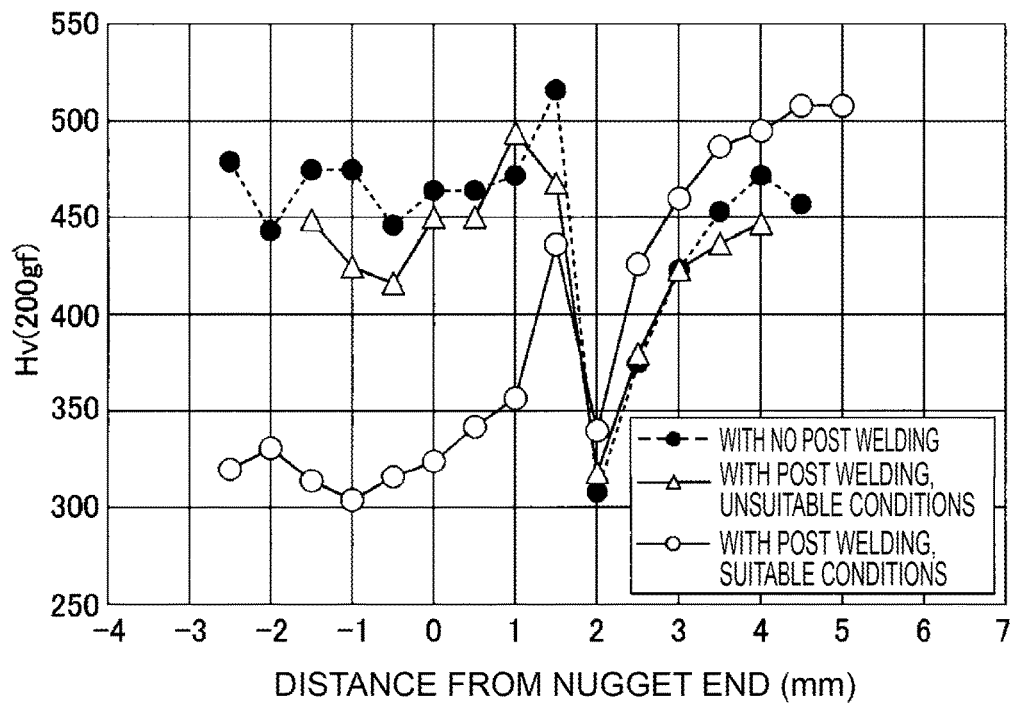
FIG. 1 is a graph illustrating examples of change in Vickers hardness in spot weld portions using a one-stage welding and a two-stage welding.

FIG. 1 illustrates an example of results of such testing. In the example of FIG. 1, spot welding was performed employing steel sheets having C: 0.22% by mass, a tensile strength of 1510 MPa, and a sheet thickness of 2 mm. The origin 0 of the horizontal axis in FIG. 1 indicates an intersection between overlapping faces of the steel sheets that form a steel sheet press contact portion, and the line of fusion of the nugget. The positive side indicates the distance from the origin toward the overlapping faces, and the negative side indicates the distance from the origin toward the nugget. The black circles refer to an example in which only a main welding was performed, and a post welding was not performed, and the white circles and the triangles refer to examples using the two-stage welding, in which a post welding was performed after the main welding with a cooling period sandwiched therebetween. The white circles indicate an example in which welding was performed under suitable conditions, and the triangles indicate an example in which welding was performed under unsuitable conditions.

Figure 2:
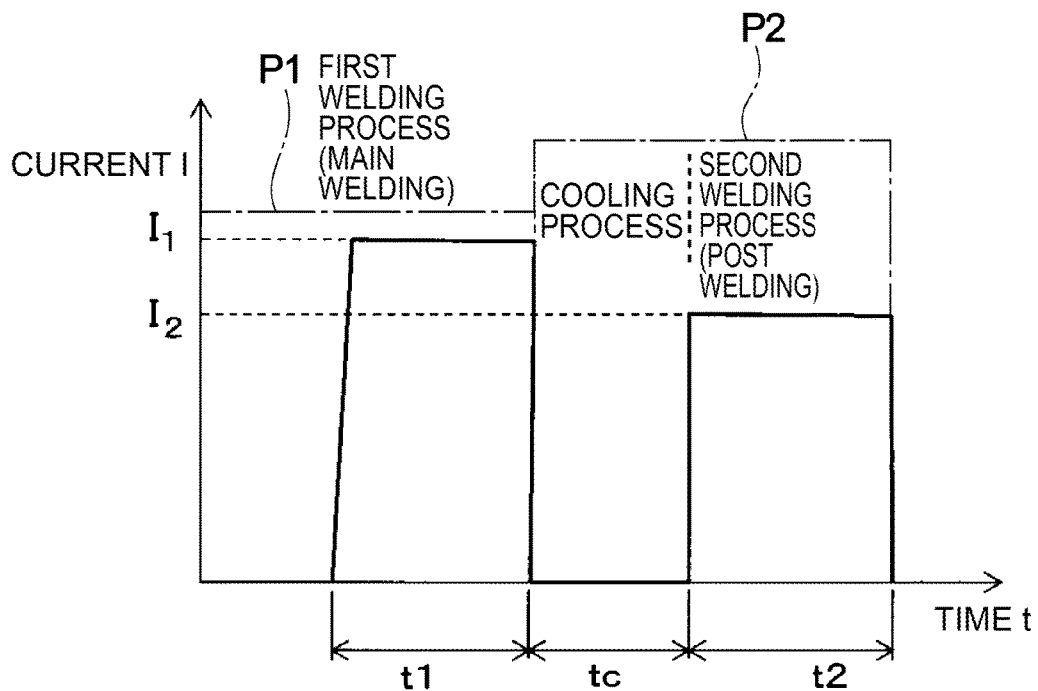
FIG. 2 is a diagram to explain the basic concept of a welding and pressure application pattern in spot welding.

As illustrated in FIG. 2, the two-stage welding employed a welding pattern in which the main welding (a first welding process) is performed at a current $I_1$, then cooling is performed for a cooling time tc, during which a current of welding is zero, and then the post welding (a second welding process) is performed at a current $I_2$ for a welding time of t2. Welding conditions A in the case of the triangles were $I_2/I_1$: 0.6, tc: 0.6 sec, t2: 2.0 sec, and welding conditions B in the case of the white circles were $I_2/I_1$: 0.6, tc: 1.2 sec, t2: 1.2 sec.

It can be seen from FIG. 1 that when spot welding is performed using a welding pattern in which only a main welding is performed, and a post welding is not performed, the Vickers hardness has a high value in the vicinity of the nugget end; however the hardness in the vicinity of the nugget end decreases when welding uses the two-stage welding. Even when employing two-stage welding, the amount of softening varies according to the welding conditions. There is a small amount of softening in the case of the unsuitable welding conditions A, with little difference to when no post welding is employed. However, there is a large amount of softening in the case of the suitable welding conditions B, and it can be seen that the Vickers hardness is greatly reduced in the vicinity of the nugget end.

As a result of investigating the delayed fracture resistance characteristics of joints welded under the welding conditions A and B using a hydrochloric acid pickling test, described later, cracking was observed in the weld portion under the welding conditions A that gave a small amount of softening in the vicinity of the nugget end. However, under the welding conditions B that gave a large amount of softening, cracking was not observed in the weld portion.

Based on the above results, the inventors then produced numerous test samples with different amounts of softening, by adjusting the welding conditions and pressure, and investigated the relationship between hardness in the vicinity of the nugget end, and the metal structure and delayed fracture resistance characteristics. As a result, it was found that the metal structure had a tempered martensite structure in a range from −L to +L from the nugget end, where L is the length of the steel sheet press contact portion, and the average value of the Vickers hardness in this range was 400 or lower, enabling spot welded joints with excellent delayed fracture resistance characteristics to be obtained.

The present invention was arrived at based on such investigative results. Explanation follows in sequence regarding necessary conditions of the present invention.

Target Steel Sheet

The spot welded joint target of the present invention is a joint formed by spot welding high strength steel sheets having a carbon content of 0.15% by mass or greater, and having a tensile strength of 980 MPa or greater.

This is due to the fact that some or all of the base material structure of such a steel sheet has a martensite structure. After spot welding, the entire nugget and heat affected zone in the vicinity of the nugget have a martensite structure, giving rise to issues of delayed fracture of the joint.

Note that there is no particular upper limit to the tensile strength; however, regarding spot weldability, the upper tensile strength limit is currently approximately 2000 MPa.

Metal Structure and Hardness in the Vicinity of the Nugget End

In order to prevent delayed fracture of the spot weld portions, there is a need to reduce hardness and residual tensile stress in the vicinity of the nugget end. In particular, it is very important to perform softening between the steel sheet press-contact portion and a nugget end portion, where fractures develop and propagate.

In the present invention, as a result of investigation such as described above, it was found that the metal structure in a range from −L to +L had a tempered martensite structure in a cross-section of the welded joint including the nugget, wherein the origin (0 point) is the intersection between the steel sheet press-contact portion and the line of fusion of the nugget, and L is the length of the steel sheet press-contact portion, as illustrated in FIG. 3. Moreover, the Vickers hardness within this range had an average value of 400 or lower, enabling a marked improvement in delayed fracture resistance characteristics.

In the present invention, it is thought that using the post welding that follows the main welding to heat the nugget and the welding heat affected zone to reduce the hardness in the vicinity of the nugget end over the range described above, enabled a reduction in residual tensile stress to be achieved at the same time, and thereby improved the delayed fracture resistance characteristics.

Note that the Vickers hardness may be tested using a method such as the following.

Firstly, a spot welded joint formed by spot welding is cut to give a cross-section that is orthogonal to the sheet surface and that passes through center of the nugget. A sample piece including the nugget is cut out from the cut piece, is embedded in a resin or the like, and the face of the cross-section is polished. Then, as illustrated in FIG. 3, the Vickers hardness Hv is tested from the inside of the nugget to a position that has undergone virtually no softening, along a line running parallel to the overlapping faces of the steel sheet press-contact portion, at a displacement of 0.2 mm from the overlapping faces.

Chemical Composition of the Steel Sheet

The chemical composition of the steel sheet is not particularly limited other than in carbon content, and a known hot stamp material, a thin steel sheet referred to as super high tensile, or a plated thin steel sheet is employed. As a more specific example, a steel sheet having a chemical composition such as below may be employed.

For example, a steel sheet may be employed that is composed of, in percentage by mass, C: from 0.15% to 0.50%, Si: from 0.01% to 2.50%, Mn: from 1.0% to 3.0%, P: 0.03% or less, S: 0.01% or less, N: 0.0100% or less, O: 0.007% or less, and Al: 1.00% or less, with the remainder being Fe and unavoidable impurities, and further including elements selected from the group consisting of (a) to (c) below, if required:

(a) One, or two, or more, out of Ti: from 0.005% to 0.10%, Nb: from 0.005% to 0.10%, and V: from 0.005% to 0.10%.
(b) One, or two, or more, selected from out of B: from 0.0001% to 0.01%, Cr: from 0.01% to 2.0%, Ni: from 0.01% to 2.0%, Cu: from 0.01% to 2.0%, Mo: from 0.01% to 0.8%.
(c) At least one out of the group consisting of Ca, Ce, Mg, and the rare earth metals (REM), up to a total of from 0.0001% to 0.5%.

Spot Welded Joint Manufacturing Method

Spot welding is performed as follows to form the spot welded joint described above.

FIG. 2 illustrates an example of a welding pattern in a spot welding process. In this current pattern, firstly, a first welding process is performed to form the nugget with a primary current $I_1$ as the main welding, while applying a specific pressure P1. Then, a pressure P2, this being larger than the pressure that was applied until the first welding process, is applied, welding is completely stopped, and after a cooling process of cooling time tc has elapsed, a second welding process is performed to soften the nugget and the periphery thereof with a post welding at a secondary current $I_2$ for a welding time t2. Then, after completing the welding of the second welding process, welding electrodes are removed from the steel sheets at the point when a specific holding time has elapsed, and the pressure is released. P2−P1≥50 kgf (490N). The difference (P2−P1) between the pressures does not have a particular specified upper limit, but is set within a range in which there are no obvious dents (indentations) in the steel sheet.

In the above, the welding conditions are set within the following ranges.

$I_2/I_1$: from 0.5 to 0.8
tc: from 0.8×tmin to 2.5×tmin
t2: from 0.7×tmin to 2.5×tmin Note that tmin with respect to the sheet thickness H (mm) is expressed by the following $$tmin = 0.2 \times H^2 \qquad \text{Equation (1)}.$$

The reasons for these welding conditions are explained below.

$I_2/I_1$: From 0.5 to 0.8

In order to soften the weld portion with the post welding and achieve a hardness distribution with an average Vickers hardness value of 400 or lower in the range from −L to +L, it is necessary to set the current $I_2$ in the post welding within a range of (0.5 to 0.8)×$I_1$ with respect to the current $I_1$.

If $I_2/I_1$ is below 0.5, the heating temperature during the post welding is low, and the degree of softening at the weld portion is insufficient, or the region that is softened does not cover the entire range from −L to +L. The delayed fracture resistance characteristic improving effect is accordingly small. However, if $I_2/I_1$ exceeds 0.8, then the nugget formed by the main welding and the heat affected zone (HAZ) is re-heated to the austenite phase region, and quenching occurs in the subsequent cooling process. Since softening therefore cannot be achieved, an improvement in the delayed fracture resistance characteristics cannot be achieved.

Even if $I_2/I_1$ exceeds 0.8, the weld portion can sometimes be brought to the temperature range in which softening occurs if t2 is set to a very short duration. However, if variation occurs in the gap between the steel sheets, or in the contact state between the electrodes and the steel sheets, sometimes the weld portion strays from the correct temperature and softening cannot be achieved. Namely, stable softening is difficult to achieve.

$I_2/I_1$ is preferably set within a range of from 0.55 to 0.75, this being desirable from the viewpoint achieving stable and adequate softening.

Note that $I_1$ is determined according to the desired nugget diameter.

tc: from 0.8×tmin to 2.5×tmin

In order to soften the weld portion in the post welding and achieve the required hardness distribution, it is necessary to set the cooling time tc after the main welding to within a range of from 0.8×tmin to 2.5×tmin, calculated according to the steel sheet thickness H using the equation (0.2×H²).

If tc is below 0.8×tmin, the temperature drop during the cooling process after the main welding is insufficient, and there is little or no martensite generation within the nugget and the HAZ (namely, most or all is still present as austenite). Softening (tempering) during the post welding is accordingly sometimes unachievable.

However, if tc is above 2.5×tmin, as well as entailing reduced productivity, tempering is also insufficient unless the duration of the subsequent post welding is made very long, and sometimes delayed fracture cannot be prevented. The range of tc is accordingly set to from 0.8× to 2.5×tmin. Note that in cases in which the sheet thickness of the steel sheet for spot welding varies, the average sheet thickness is taken as H.

t2: from 0.7×tmin to 2.5×tmin

In order to soften the weld portion and achieve the required hardness distribution in the post welding, it is necessary to set the time t2 of the post welding after the cooling process to from 0.7×tmin to 2.5×tmin.

If t2 is less than 0.7×tmin, the temperature increase during the post welding is insufficient, and sometimes softening (tempering) of the martensite within the nugget and the HAZ is unachievable. However, since softening by tempering depends more heavily on the temperature than on the duration for which it is maintained, even if tc exceeds 2.5×tmin, the temperature distribution of the weld portion attains a steady state, with little change to the hardness distribution of the weld portion, and with a further reduction in productivity. The range of t2 is accordingly set to from 0.7× to 2.5×tmin.

Figure 4:
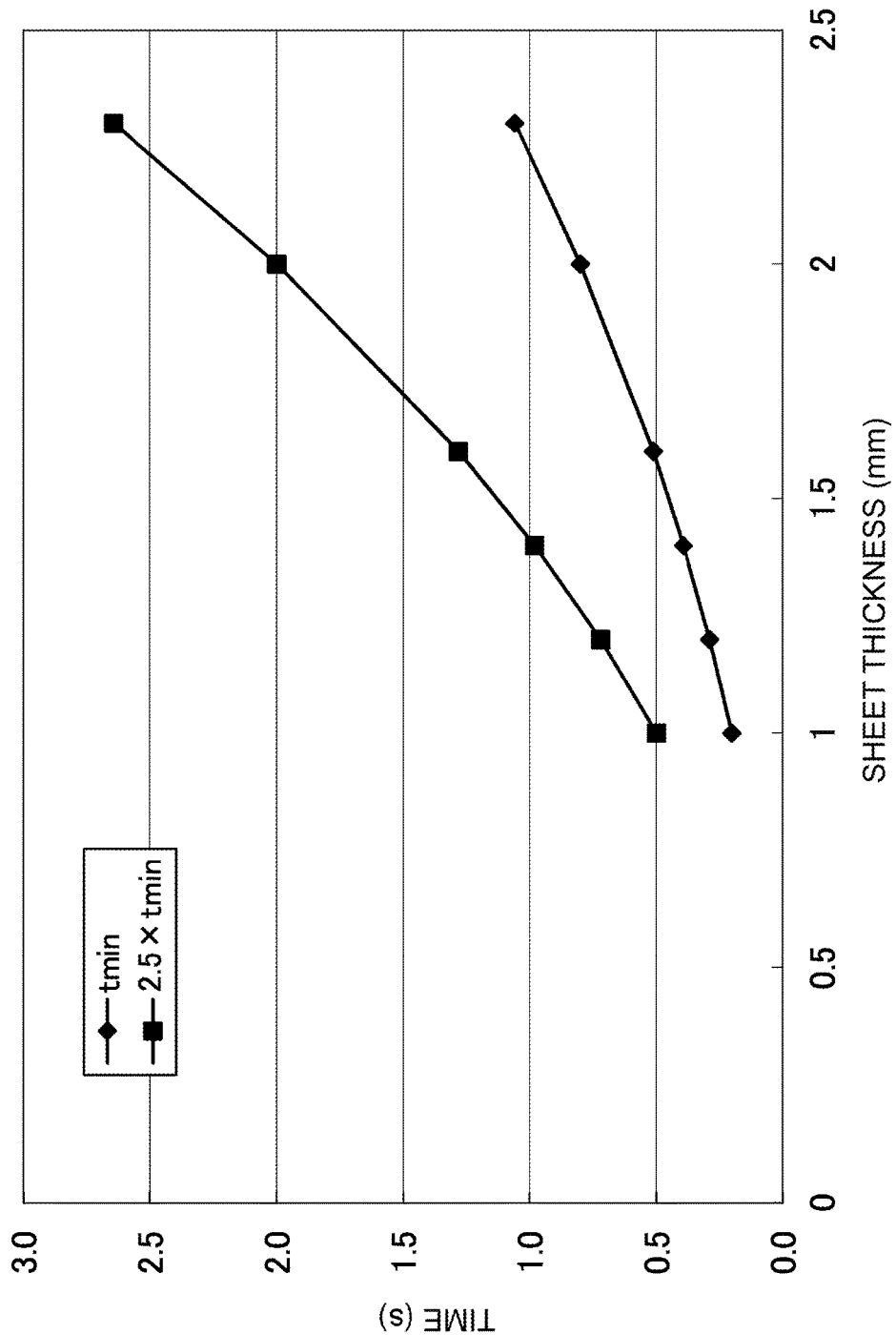
FIG. 4 is a line graph illustrating relationship between sheet thickness, and tmin and 2.5×tmin.

FIG. 4 illustrates a relationship between sheet thickness, and tmin and 2.5×tmin. The sheet thickness range corresponds to, for example, a range of sheet thicknesses in automotive steel sheet.

The present invention is configured as described above. Further explanation follows regarding implementability and advantageous effects of the present invention using examples.

EXAMPLES

Example 1

Cold-rolled steel sheets having C: 0.22% by mass, sheet thickness: 2 mm, and tensile strength: 1510 MPa were prepared. The steel sheets were overlapped and spot welding was performed under the conditions listed in Table 1 using a servo-gun welding machine, to produce sample spot welded joints (number n=30) for Vickers hardness testing. The main welding conditions were kept constant. A squeezing time between applying pressure and the welding, and a pressure holding time after the post welding, were also kept constant. The pressure until the main welding process was set to 450 kgf (4410N). The pressure from the cooling process onward was set to the three values of 450 kgf (4420N), 500 kgf (4900N), and 650 kgf (6370N).

Note that preliminary testing was performed prior to spot welding, and, based on the preliminary testing results, the current amount of the main welding in spot welding was set such that the nugget diameter attained a value of 4.5 times the square root of the sheet thickness of a single steel sheet (4.5√t).

As illustrated in FIG. 3, the Vickers hardness within the nugget and in the heat affected zone was tested at a pitch of 500 μm along a joint interface of a cross-section cut in the sheet thickness direction at the plate width center of the sample piece produced above. Note that Vickers hardness testing was performed based on JIS-Z2244 under a load of 200 gf (1.96133N).

For hydrochloric acid pickling testing, a steel sheet having a sheet thickness of 1.4 mm was inserted between both edges of the cold-rolled steel sheet mentioned above to open a gap at a central spot welding portion, and spot welding was performed similarly to the above at the central portion in a restrained state of both edges, so as to produce test pieces in a state with stress applied to the weld portion. The presence or absence of cracking was investigated after pickling the test pieces in 0.15 N (normalities) hydrochloric acid for 100 hours. The presence or absence of cracking was confirmed by cutting to give a cross-section of the spot welded joint formed by spot welding orthogonal to the sheet surface and passing through the center of the nugget, cutting out a sample piece including the nugget from the cut piece, embedding the sample piece in resin or the like, polishing the cross-section face, and inspecting the polished cross-section using an optical microscope.

The test results and evaluation results thereof are also listed in Table 1. Note that L was 0.6 mm.

As demonstrated in Table 1, in the examples of the present invention, cracking did not occur in hydrochloric acid pickling testing, and spot welded joints with excellent delayed fracture resistance characteristics were obtained.

However, in a comparative example that did not satisfy the conditions of the present invention regarding the pressure in the cooling process onward, cracking was observed in hydrochloric acid pickling testing, and spot welded joints with excellent delayed fracture resistance characteristics were not obtained.

TABLE 1

| Pressure until main welding process (kgf) | Pressure from cooling process onward (kgf) | Main welding current I1 (kA) | Main welding time t1 (s) | Cooling time tc (s) | tmin (s) | Post welding current I2 (kA) | I2/I1 | Post welding time t2 (s) | 2.5 × tmin (s) | Average hardness in −L to +L range (Hv) | Hydrochloric acid pickling testing result (number of cracks, n = 30) | Comments |
|---|---|---|---|---|---|---|---|---|---|---|---|---|
| 450 | 500 | 8.0 | 0.36 | 1.2 | 0.8 | 4.8 | 0.60 | 1.2 | 2 | 370 | 0/30 | Example of the present invention |
| 450 | 650 | 8.0 | 0.36 | 1.2 | 0.8 | 4.8 | 0.60 | 1.2 | 2 | 365 | 0/30 | Example of the present invention |
| 450 | <u>450</u> | 8.0 | 0.36 | 1.2 | 0.8 | 4.8 | 0.60 | 1.2 | 2 | 373 | <u>3/30</u> | Comparative example |

Example 2

Cold-rolled steel sheets having C: 0.22% by mass, sheet thickness: 2 mm, and tensile strength: 1510 MPa were prepared. The steel sheets were overlapped and spot welding wes performed similarly to in Example 1, under the conditions listed in Table 2. Vickers hardness testing and hydrochloric acid pickling testing were performed. The pressure until the main welding process was set to 450 kgf (4410N). The pressure from the cooling process onward was set to 550 kgf (5390N).

The test results and evaluation results thereof are also listed in Table 2. Note that L was 0.8 mm.

As demonstrated in Table 2, in the examples of the present invention, cracking did not occur in hydrochloric acid pickling testing, and spot welded joints with excellent delayed fracture resistance characteristics were obtained.

However, for comparative examples in which the post welding was not performed, or the cooling time and post welding time did not satisfy the conditions of the present invention, cracking was observed in hydrochloric acid pickling testing, and spot welded joints with excellent delayed fracture resistance characteristics were not obtained.

TABLE 2

| Sheet thickness (mm) | Base material strength (MPa) | Pressure until main welding process (kgf) | Pressure from cooling process onward (kgf) | Main welding current I1 (kA) | Main welding time t1 (s) | Cooling time tc (s) | tmin (s) | Post welding current I2 (kA) | I2/I1 | Post welding time t2 (s) | 2.5 × tmin (s) | Average hardness in from −L to +L range (Hv) | Hydrochloric acid pickling testing result | Comments |
|---|---|---|---|---|---|---|---|---|---|---|---|---|---|---|
| 2 | 1510 | 450 | 550 | 8.0 | 0.36 | — | 0.8 | — | — | — | 2 | 485 | B (cracking present) | Comparative example |
| 2 | 1510 | 450 | 550 | 8.0 | 0.36 | 0.6 | 0.8 | 4.8 | 0.60 | 2 | 2 | 450 | B (cracking present) | Comparative example |
| 2 | 1510 | 450 | 550 | 8.0 | 0.36 | 3 | 0.8 | 4.8 | 0.60 | 0.8 | 2 | 410 | B (cracking present) | Comparative example |
| 2 | 1510 | 450 | 550 | 8.0 | 0.36 | 1.2 | 0.8 | 4 | 0.50 | 3 | 2 | 435 | B (cracking present) | Comparative example |
| 2 | 1510 | 450 | 550 | 8.0 | 0.36 | 1.2 | 0.8 | 4.8 | 0.60 | 0.5 | 2 | 420 | B (cracking present) | Comparative example |
| 2 | 1510 | 450 | 550 | 8.0 | 0.36 | 1.2 | 0.8 | 4.8 | 0.60 | 1.2 | 2 | 370 | G (no cracking) | Example of the present invention |
| 2 | 1510 | 450 | 550 | 8.0 | 0.36 | 1.2 | 0.8 | 5.2 | 0.65 | 1.2 | 2 | 365 | G (no cracking) | Example of the present invention |

Example 3

Cold-rolled steel sheets having C: 0.21% by mass, sheet thickness: 1.2 mm, and tensile strength: 1486 MPa were prepared (number n=3). The steel sheets were overlapped and spot welding was performed similarly to in Example 1, under the conditions listed in Table 3. Vickers hardness testing and hydrochloric acid pickling testing were performed. The pressure until the main welding process was set to 350 kgf (3430N). The pressure from the cooling process onward was set to 450 kgf (4410N).

The test results and evaluation results thereof are also listed in Table 3. Note that L was 0.5 mm.

As demonstrated in Table 3, in the present Example, in the examples of the present invention, cracking did not occur in hydrochloric acid pickling testing, and spot welded joints with excellent delayed fracture resistance characteristics were obtained.

However, for comparative examples in which the post welding was not performed, or the cooling time and the current conditions of the post welding did not satisfy the conditions of the present invention, cracking was observed in hydrochloric acid pickling testing, and spot welded joints with excellent delayed fracture resistance characteristics were not obtained.

TABLE 3

| Sheet thickness (mm) | Base material strength (MPa) | Pressure until main welding process (kgf) | Pressure from cooling process onward (kgf) | Main welding current I1 (kA) | Main welding time t1 (s) | Cooling time tc (s) | tmin (s) | Post welding current I2 (kA) | I2/I1 | Post welding time t2 (s) | 2.5 × tmin (s) | Average hardness in from −L to +L range (Hv) | Hydrochloric acid pickling testing result | Comments |
|---|---|---|---|---|---|---|---|---|---|---|---|---|---|---|
| 1.2 | 1486 | 350 | 450 | 6.5 | 0.36 | — | 0.29 | — | — | — | 0.72 | 480 | B (cracking present) | Comparative example |
| 1.2 | 1486 | 350 | 450 | 6.5 | 0.36 | 0.2 | 0.29 | 4 | 0.62 | 0.7 | 0.72 | 465 | B (cracking present) | Comparative example |
| 1.2 | 1486 | 350 | 450 | 6.5 | 0.36 | 2 | 0.29 | 4 | 0.62 | 0.3 | 0.72 | 412 | B (cracking present) | Comparative example |
| 1.2 | 1486 | 350 | 450 | 6.5 | 0.36 | 0.5 | 0.29 | 3 | 0.46 | 2 | 0.72 | 427 | B (cracking present) | Comparative example |
| 1.2 | 1486 | 350 | 450 | 6.5 | 0.36 | 0.5 | 0.29 | 4 | 0.62 | 0.10 | 0.72 | 423 | B (cracking present) | Comparative example |
| 1.2 | 1486 | 350 | 450 | 6.5 | 0.36 | 0.5 | 0.29 | 4 | 0.62 | 0.5 | 0.72 | 386 | G (no cracking) | Example of the present invention |
| 1.2 | 1486 | 350 | 450 | 6.5 | 0.36 | 0.5 | 0.29 | 4.5 | 0.69 | 0.5 | 0.72 | 359 | G (no cracking) | Example of the present invention |

As can be seen from the evaluation results of the above Examples, in spot welding, when the pressure P2 applied by the electrodes from the cooling process onward is set greater than the pressure P1 applied by the electrodes until the first welding process, the contact surface between the electrodes and the steel sheets increases, increasing the effect of heat extraction from the steel sheets. The time until the temperature falls to an Ms point (the temperature at which martensite appears), namely the required duration of the cooling process, is thereby reduced. Moreover, variation can be suppressed in the reduction of solidification segregation and reduction in hardness by tempering, enabling variation in delayed fracture evaluation results to be similarly suppressed. This thereby enables stable suppression of delayed fracture (hydrogen embrittlement cracking).

Reducing the time required for the cooling process enables a reduction in the overall time required for spot welding. Moreover, the time saved in the cooling process can be allocated to the second welding process, and tempering time can be increased, enabling stable reduction in hardness. The expulsion of hydrogen from the spot weld portion is also promoted.

The entire contents of the disclosure of Japanese Patent Application No. 2013-86837, filed on Apr. 17, 2013, are incorporated by reference in the present specification.

All publications, patent applications and technical standards mentioned in the present specification are incorporated by reference in the present specification to the same extent as the individual publication, patent application, or technical standard is specifically and individually indicated to be incorporated by reference.

The invention claimed is:

1. A spot welding method comprising:
overlapping high strength steel sheets each having a carbon content of 0.15% by mass or greater and a tensile strength of 980 MPa or greater, and
spot welding the steel sheets to obtain a spot welded joint, the spot welding including:
a first welding that forms a nugget;
a cooling that follows the first welding and during which a current of welding is zero; and
a second welding that follows the cooling,
wherein in the second welding, a martensite structure formed by the first welding and the cooling is tempered to form a tempered martensite structure and the nugget is softened, and
wherein during the spot welding,
$I_2/I_1$ is set to from 0.5 to 0.8 wherein $I_1$ is a current in the first welding and $I_2$ is a current in the second welding,
a time tc (sec) of the cooling is set within a range of from 0.8×tmin to 2.5×tmin wherein tmin is calculated using Equation (1) below according to a sheet thickness H (mm) of the steel sheets,
a welding time t2 (sec) of the second welding is set within a range of from 0.7×tmin to 2.5×tmin, and
a pressure applied by electrodes from the cooling onward is set to greater than a pressure applied by the electrodes until the first welding $$tmin = 0.2 \times H^2 \qquad (1).$$

2. The spot welding method of claim 1, wherein the high strength steel sheets are plated steel sheets.

3. The spot welding method of claim 1, wherein a metal structure of the spot welded joint in a range from −L to +L in a cross section of the spot welded joint includes the tempered martensite structure when the origin (0 point) is set at an intersection between a steel sheet press-contact portion and a line of fusion of the nugget and L is set to a length of the steel sheet press-contact portion, and a Vickers hardness in the range from −L to +L in the cross section of the spot welded joint has an average value of 400 or lower.

4. The spot welding method of claim 1, wherein when the pressure applied by the electrodes until the first welding process is set to P1 and the pressure applied by the electrodes from the cooling process onward is set to P2, $$P2 - P1 \geq 490N.$$

5. The spot welding method of claim 1, wherein the sheet thickness is 1.2 mm or more.

* * * * *